Figure 1:
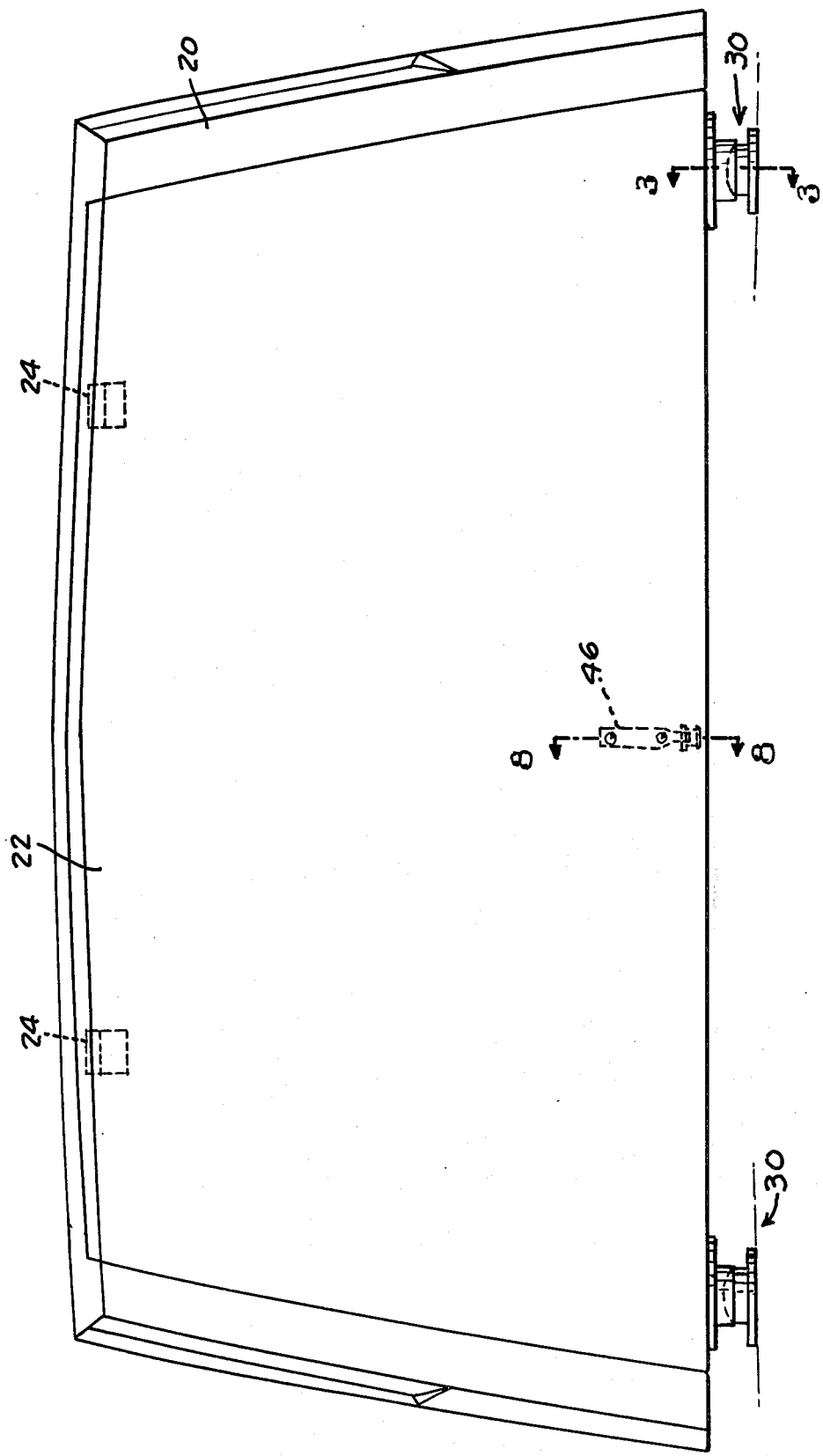

United States Patent [19]

Vallee et al.

[11] 4,173,965

[45] Nov. 13, 1979

[54] PASSENGER VEHICLE APPLIED TOP CONTAINER

[75] Inventors: Robert G. Vallee; Arnold P. Saviano, both of Grosse Pointe Woods, Mich.

[73] Assignee: George P. Johnson Co., Warren, Mich.

[21] Appl. No.: 862,866

[22] Filed: Dec. 21, 1977

[51] Int. Cl.² .................................................. B60R 9/04
[52] U.S. Cl. ........................................ 224/328; 224/315
[58] Field of Search .......... 224/29 R, 42.1 R, 42.1 D, 224/42.1 E, 309, 313, 315, 317, 318, 328; 296/37.7, 37.8; D12/157; 248/500, 502, 503, 507, 508, 509; 24/211 R, 221 R, 221 K; 280/179 R; 105/475, 476, 481, 482, 483, 485

[56] References Cited

U.S. PATENT DOCUMENTS

| 3,540,087 | 11/1970 | Marosy | 24/211 R |
|---|---|---|---|
| 3,593,898 | 7/1971 | Diforte | 224/42.1 E |
| 3,838,802 | 10/1974 | Grycel | 224/29 R X |
| 4,071,176 | 1/1978 | Tuzee | 224/42.1 E |

FOREIGN PATENT DOCUMENTS

| 1212430 | 3/1966 | Fed. Rep. of Germany | 224/42.1 R |
|---|---|---|---|
| 2428438 | 1/1976 | Fed. Rep. of Germany | 224/42.1 D |
| 423400 | 4/1911 | France | 24/221 R |
| 1055040 | 4/1952 | France | 224/42.1 E |
| 104715 | 6/1941 | Sweden | 224/42.1 E |

OTHER PUBLICATIONS

Mechanix Illustrated; "A Lockable Ski Rack for Your Car"; Jan., 1973; pp. 88 & 89.

Primary Examiner—Stephen G. Kunin
Assistant Examiner—Winston H. Douglas
Attorney, Agent, or Firm—Barnes, Kisselle, Raisch & Choate

[57] ABSTRACT

A theftproof vehicle top container having a releasable fixture to attach to a vehicle top accessible for attachment or release only from within the container and adaptable to a wide variety of top configurations, the container being made of rigid materials with side and top hatch openings closable by hinged, lock covers.

1 Claim, 9 Drawing Figures

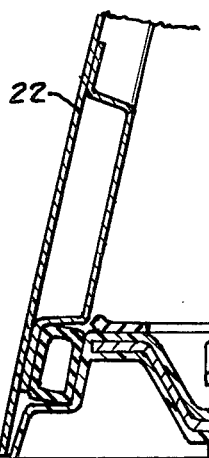
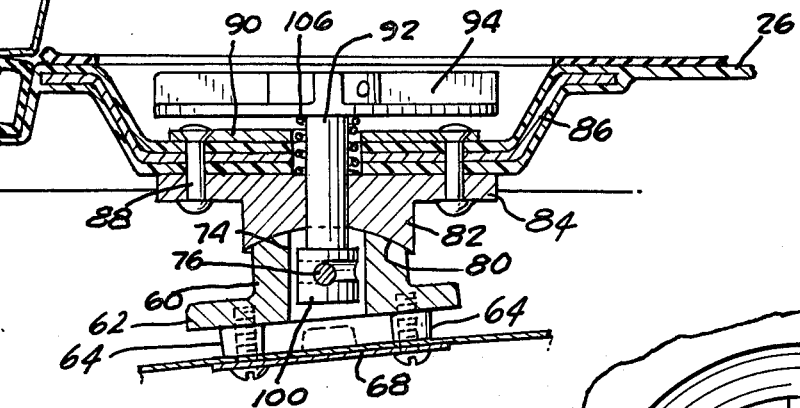
FIG. 3
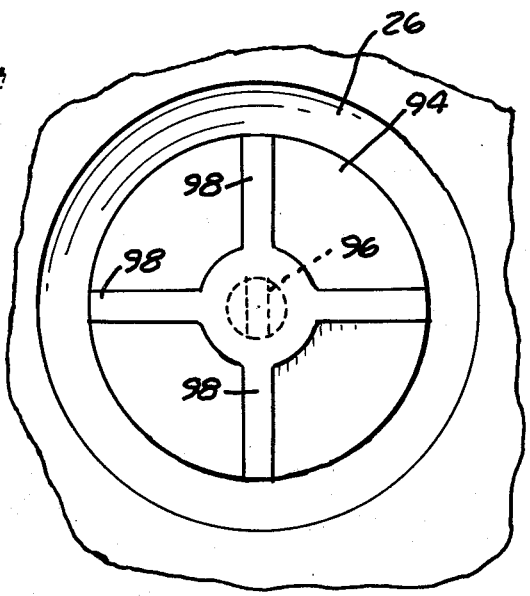
FIG. 5
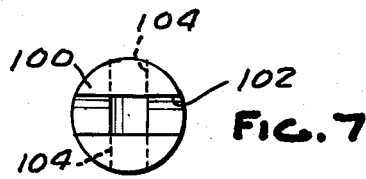
FIG. 7
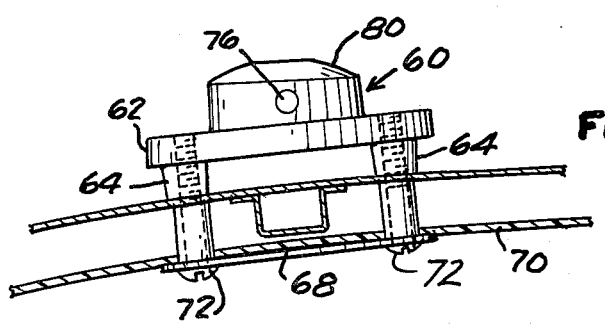
FIG. 4
FIG. 6

PASSENGER VEHICLE APPLIED TOP CONTAINER

This invention relates to a Passenger Vehicle Applied Top Container and more particularly to a device for permanent fastening to the top of a vehicle so constructed that it can be applied to a diversity of vehicle tops and locked against accidental loss and theft.

In recent years, there has been a trend toward smaller and lighter vehicles for the purpose of reducing weight with the concomitant increase in gas mileage. Part of this trend has also been stimulated by the competition of foreign imports in the United States, most of which are rather small vehicles.

This reduction in size has resulted in a loss of trunk space. Similarly, even station wagons have been reduced in size so that the available space is less than it has been in the large vehicles. Accordingly, persons traveling with the vehicle seats full, such as families with children or couples traveling together, have experienced a need for additional luggage space.

On the other hand, the inconvenience of a luggage rack has also created a need for an improved carrier. Luggage racks held on to the drip rails of a vehicle by a canvas strap are easily removed by unauthorized persons by simply loosening or cutting the strap, and, in addition, the material carried on the luggage racks could be readily removed by thieves and also subject to weather since it is difficult to weatherproof luggage which is carried on the top of the car.

These various trends have lead to the present invention which includes a hard case luggage container having convenient opening panels which can be locked in closed position and also to a luggage case which can be permanently affixed to a car in such a way that it cannot be removed without breaking into the hard case and removing the contents by force.

It is thus an object of the invention to provide a container which is carried on the top of a vehicle and so mounted that it cannot be moved by unauthorized persons without destruction of the case.

It is a further object to provide a device in which the opening panels are locked in place by locks which are invisible from the sides of the device and which are protected from the weather.

A further object is the provision of fastening devices which will adapt to the various curvatures of vehicle tops making them universally acceptable for various models and shapes.

A still further object of the invention is the provision of fastening devices which can be applied to vehicles without interference with the decorative and sound-proofing sealing linings on the interior of the top while still maintaining a sealed condition which prevents leakage into the vehicle.

Other objects and features of the invention relating to details of construction will be apparent in the following description and claims in which the principles of the invention are set forth together with a specification which will enable those skilled in the art to practice the invention, all in connection with the best mode presently contemplated for the invention.

DRAWINGS accompany the disclosure and the various views thereof may be briefly described as:

FIG. 1, a side view of the top container.

Figure 2:
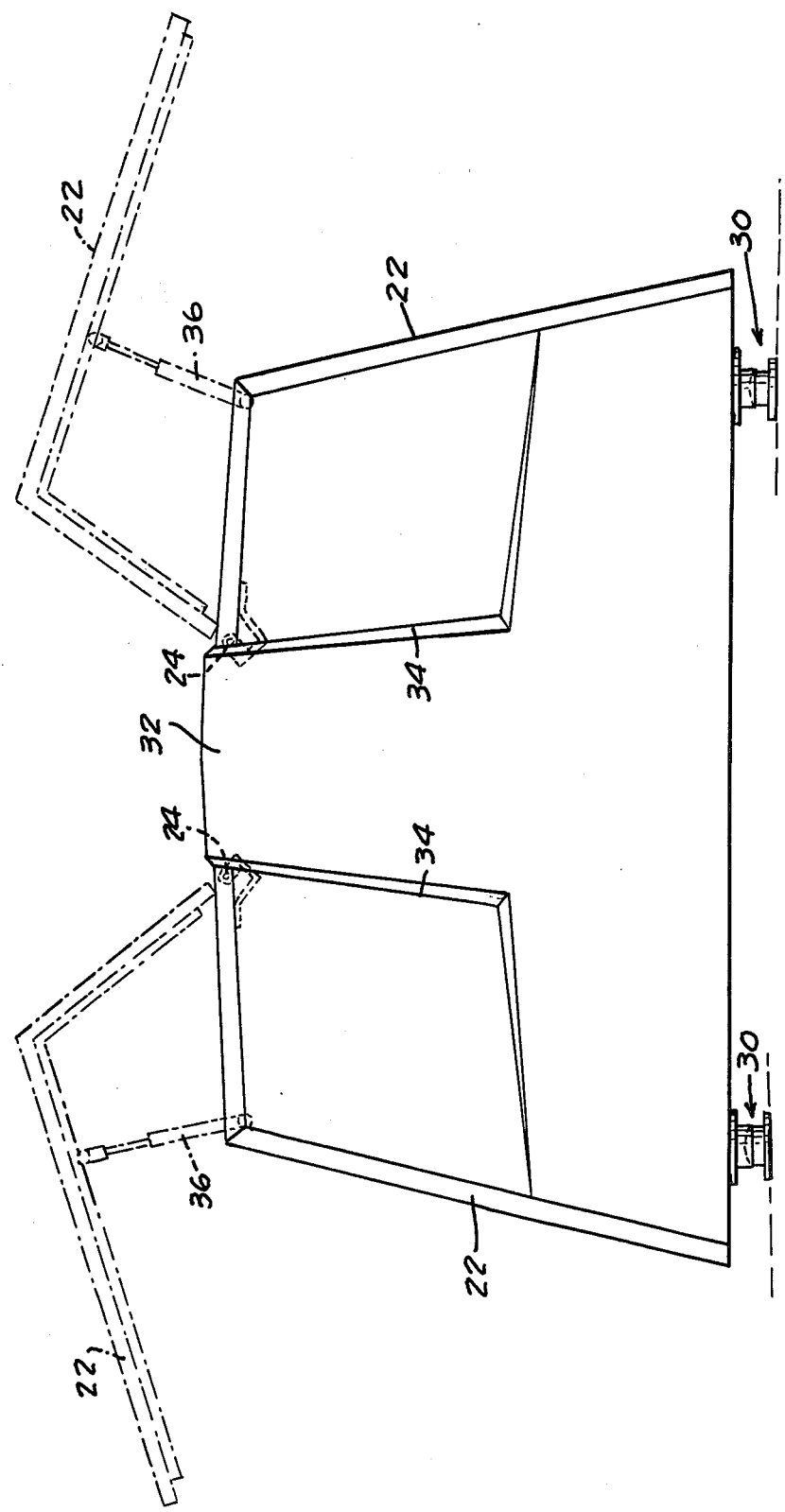

FIG. 2, an end view of the container showing the open position of the closure panels in dotted line.

FIG. 3, a sectional view of a fastening construction taken on line 3—3 of FIG. 1.

FIG. 4, a bottom view of the fastening construction.

FIG. 5, a top view of the fastening construction.

FIG. 6, a view of the roof top anchor portion of the fastening construction utilized in connection with a roof with a double panel including a head liner.

FIG. 7, a bottom view of the holddown lock shaft illustrated in FIG. 3.

Figure 8:
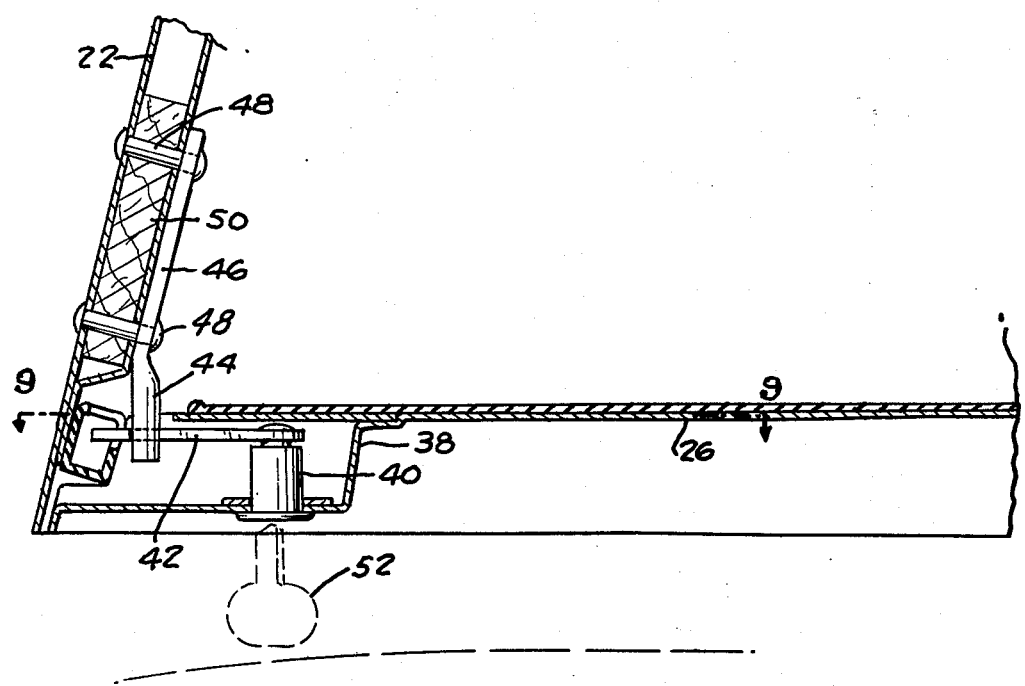

FIG. 8, a sectional view on line 8—8 of FIG. 1 showing the locking mechanism.

Figure 9:
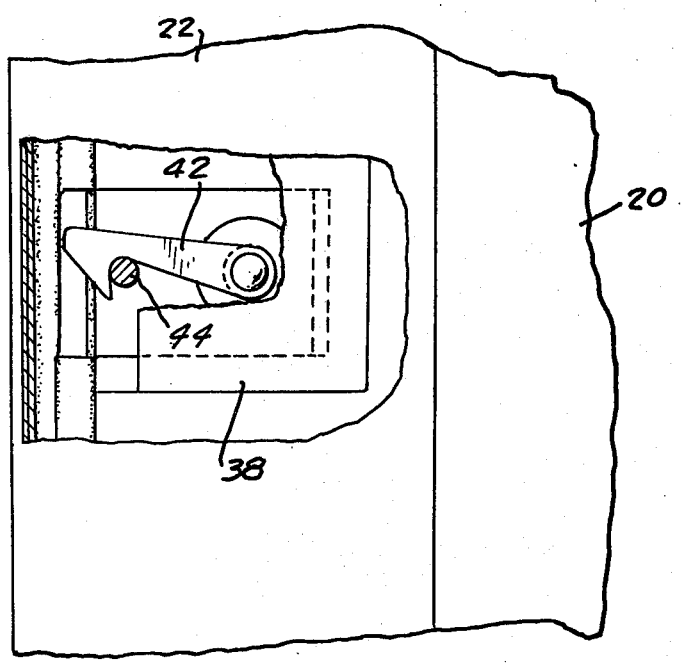

FIG. 9, a plan view of the locking mechanism taken on line 9—9 of FIG. 8.

REFERRING TO THE DRAWINGS

In FIG. 1, a side view of the container is shown in which the case 20 has hinged L-shaped side panels 22 provided with invisible hinges 24 of standard construction. This structure has a base panel 26 shown in FIGS. 3 and 8 and anchoring assemblies 30. Each end panel 32 of the case has shallow indentations 34 for decorative purposes and the doors 22 have an L-shape so that the top leg overlies a portion of the top of the device and the side leg closes the side opening. Suitable stop devices 36 are illustrated to hold the closure panels in open position and control the action thereof. The locking construction for the side panels is shown in FIGS. 8 and 9.

Underneath the base panel 26 is a lock compartment 38 with a key cylinder 40 to operate a latch lever 42 which engages a latch pin 44 anchored to the closure panel by a strap 46 and rivets 48. The closure panel has a double wall construction at this point with a rigid filler element 50 which rigidifies the lock pin mount.

It will be seen that the key 52 for operating the lock cylinder 40 is insertable from the bottom of the device so that the opening is not exposed to the weather and is not readily visible to a casual observer.

The mounting fastening fixture for the device is an extremely important feature since the curvature and angle of top surfaces of various cars will vary considerably particularly along the edges of the top. The fastening fixture is composed, first of all, of an anchor block element 60 shown in FIG. 3 having a flange portion 62 provided on the bottom with four spacer projections 64 with threaded holes into which are received bolts 66. These bolts preferably are passed through a reinforcing plate 68 below the top surface. A modified structure is shown in FIG. 6 for use with a top having a headliner panel 70. In this case, longer bolts 72 are used to pass up into the threaded projection 64.

The device shown in FIGS. 3 and 6 would be utilized when the device is installed by manufacturers as original equipment. Suitable expansion nut devices might also be utilized so that screws could pass through the flange 62 from the top and into expansion nuts which would position below holes in the top and lock the anchor base 60 to the top surface. Suitable sealing gaskets can be utilized during the assembly to insure a weatherproof construction.

The anchor block 60 has a central opening 74 and a transverse locking pin 76 passes through the walls of the anchor block 60 across this opening as illustrated in FIG. 4. The top of the anchor block 60 has a spherical configuration 80 which will cooperate with a top fixture to be described.

Referring to FIG. 3, the top plate of the fastening fixture is illustrated at 82 having a bottom surface which is spherical and complemental to the surface 80 of anchor block. The top plate has a flange 84 which is riveted to a depressed well in the base 26 of the container. Assuming that the container is made from molded plastic, the wall of the well is provided with a dished reinforcing element 86 which is molded into the plastic and the fastening rivets 88 pass through the double walls of the well and the reinforcing element and also a top cover plate 90. All of these elements are apertured to allow the passage of a lock shaft 92 which has a circular actuator plate 94 fastened on the top thereof with a suitable cross-pin 96 (FIGS. 3 and 5). This plate has radial ridges 98 to allow it to be rotated by the fingers.

At the bottom of the lock shaft 92 is an enlarged head 100 with an axial groove 102 (FIG. 7) which will receive the cross pin 76 and also radial slots 104 which will lock this pin when the lock shaft 92 is rotated 90°. A spring 106 (FIG. 3) urges the actuator plate 94 upwardly but, during assembly, the actuator plate can be pushed downwardly against the spring 106 so that the pin 94 is received in the axial slot 102. Then when the actuator is turned 90°, the pin will be positioned in the radial slots 104 and will seat therein by reason of small depressions which secure the lock shaft on the pin 76.

It will be appreciated that any particular luggage container can be mounted with four of the fastening fixtures, one at each corner, or in some instances for smaller units, three fastening fixtures mounted in a triangular pattern.

The anchor blocks are mounted on the top of a car in a predetermined location either in the original manufacture of the device or by a dealer. The top container can then be lowered on to these devices so that the top plates 82 locate on the surfaces 80 of the anchor blocks. The spherical surfaces will also enable these elements to mate securely despite the variations in curvature. The opening 74 in the anchor block is large enough to accommodate these variations in angle so that the lock shaft will have clearance when it drops into the openings.

Once the actuator plates 94 are turned to the lock position, the device is securely located and cannot be dislodged without access to the interior of the unit.

It will thus be seen that there has been provided a top container which can be permanently secured in a theftproof fashion to the top of a vehicle and locked in such a way that the container can only be entered with a proper key unless the container is destroyed.

Thus, considerable additional storage space can be provided for small vehicles with attractive devices which can be furnished to match the colors of the various cars on which it is used. The top element and sides can be molded of one piece which is secured to the base in a permanent fashion. The material used would be reinforced fiberglass or some similar material which is weatherproof and relatively rigid in its nature.

What is claimed as new is as follows:

1. A readily removable car top and security container combination which comprises:
   (a) a plurality of anchor blocks secured to a car top in spaced relation,
   (b) a relatively rigid, closable container having a base with upper and lower surfaces, end walls, and a top wall with one or more hatch openings above the side edges of the base extending to the top,
   (c) a plurality of upper fastening fixtures permanently secured to said base in locations registering respectively with said anchor blocks, said anchor blocks and fixtures having complemental mating spherical surfaces between the car top and the base of said container adaptable to engage in any one of a plurality of angular dispositions of said anchor blocks relative to said base, and having an overall vertical dimension to space said base upwardly from said car top,
   (d) manually movable means accessible only from the interior of said container to connect and disconnect said upper fastening fixtures to said anchor blocks,
   (e) one or more closure panels movably secured on said container movable to close said one or more hatch openings to seal the interior of said container from the weather,
   (f) a recess formed in the base of said container at each upper fastening fixture, and
   (g) a rotatable disc in said recess depressed below the upper surface of said base and affixed to a lock shaft to facilitate the rotation of said manually movable means to a connect or disconnect position.

* * * * *